United States Patent
Trächtler et al.

(10) Patent No.: US 11,644,387 B2
(45) Date of Patent: May 9, 2023

(54) METHOD FOR DYNAMIC LOAD SIMULATION BY MEANS OF PARALLEL KINEMATICS

(71) Applicant: Universität Paderborn, Paderborn (DE)

(72) Inventors: Ansgar Trächtler, Paderborn (DE); Karl-Peter Jäker, Erwitte (DE); Simon Olma, Paderborn (DE); Andreas Kohlstedt, Paderborn (DE); Phillip Traphöner, Bielefeld (DE)

(73) Assignee: Universität Paderborn, Paderborn (DE)

( * ) Notice: Subject to any disclaimer, the term of this patent is extended or adjusted under 35 U.S.C. 154(b) by 19 days.

(21) Appl. No.: 17/053,743

(22) PCT Filed: May 7, 2019

(86) PCT No.: PCT/EP2019/061732
§ 371 (c)(1),
(2) Date: Nov. 6, 2020

(87) PCT Pub. No.: WO2019/215187
PCT Pub. Date: Nov. 14, 2019

(65) Prior Publication Data
US 2021/0239574 A1 Aug. 5, 2021

(30) Foreign Application Priority Data
May 7, 2018 (DE) .................... DE102018110936.9

(51) Int. Cl.
*G01M 17/04* (2006.01)
*G05B 17/02* (2006.01)

(52) U.S. Cl.
CPC ............. *G01M 17/04* (2013.01); *G05B 17/02* (2013.01)

(58) Field of Classification Search
CPC ...... G01M 17/04; G01M 7/022; G05B 17/02; G05B 2219/23446
See application file for complete search history.

(56) References Cited

U.S. PATENT DOCUMENTS

| | | | | |
|---|---|---|---|---|
| 6,615,112 B1 * | 9/2003 | Roos | ...................... | G05B 19/04 700/254 |
| 2007/0260373 A1 * | 11/2007 | Langer | .................... | G06F 19/00 701/29 |

FOREIGN PATENT DOCUMENTS

| | | | | |
|---|---|---|---|---|
| DE | 19629739 C1 * | 2/1998 | ............. | G05B 19/19 |
| DE | 10021906 A1 * | 5/2000 | .......... | G01M 17/007 |

OTHER PUBLICATIONS

"Substructuring and Control Strategies for Hardware-in-the-Loop Simulations of Multiaxial Suspension Test Rigs", S. Olma, Elsevier, ScienceDirect, IFAC Conference Paper Archive, Jan. 1, 2016. (Year: 2016).*
Control of a hydraulic hexapod for a Hardware-in-the-Loop axle test rig, Andreas Kohlstedt, De Gruyter Oldengourg, Anwendungen, May 1, 2016. (Year: 2016).*
Simon Olma et al., Observer-based nonlinear control strategies for Hardware-in-the-loop simulations of multiaxial suspension test rigs, Mechatronics (journal), Oct. 31, 2017.
pp. 212-224, Mechatronics 50 (2018), Elsevier, published on-line.
Andreas Kohlstedt et al., Control of a hydraulic hexapod for a Hardware-in-the-loop axle test rig, De Gruyter Oldenbourg (journal), Apr. 11, 2016, pp. 365-374.
De Gruyter Oldenbourg, Munich, Germany.
S. Olma et al., Substructuring and Control Strategies for Hardware-in-the-loop Simulations of Multiaxial Suspension Test Rigs, IFAC Papers Online (conference paper), 2016.
pp. 141-148, IFAC—PapersOnLine 49-21 (2016), Elsevier, published on-line.

* cited by examiner

*Primary Examiner* — Tarun Sinha
*Assistant Examiner* — Lal C Mang
(74) *Attorney, Agent, or Firm* — Patent Technologies, LLC; Robert D. Gunderman, Jr.

(57) ABSTRACT

The invention relates to a method for dynamic load simulation, wherein loads are specified by target signals and applied to a test object by a parallel kinematic excitation unit via an end effector, including the following operations:

measuring loads at a contact point (200), comparing the measured loads with the target signals (300), and determining target pressures (400) for individual actuators of the parallel kinematic excitation unit for applying the target signals by use of a control algorithm ($F_{q,ref}$).

This provides a method for dynamic load simulation that reduces the time and cost expenditure compared to previously known methods and at the same time enables hardware-in-the-loop simulations to be used.

17 Claims, 3 Drawing Sheets

METHOD FOR DYNAMIC LOAD SIMULATION BY MEANS OF PARALLEL KINEMATICS

The invention relates to a method for dynamic load simulation by use of parallel kinematics. The invention also relates to a system for implementing this method.

With the ongoing development of vehicle axles, the number of electronic components increases in order to improve driving comfort and driving safety. The development and testing of such mechatronic vehicle axles require the use of efficient test systems. Mechatronic test rigs for dynamic, in particular highly dynamic, multi-axle load simulation require a sufficiently fast actuator system. Examples of load simulators are test rigs for operational stability analyses of vehicle axles. The excitation unit loads the axle test object via the wheel carrier by simulating measured force, torque, and displacement or angle profiles as precisely as possible.

Development test rigs in chassis technology, for example for operational stability analyzers, place high demands on the dynamics of the excitation units (actuators) used. Axle test rigs are a highly complex application example. They are used to develop and test vehicle axles. The test object, for example a vehicle axle, is rigidly mounted by means of a special construction at those points in the test rig where it is normally connected to the body. The wheel carriers, on the other hand, are connected via force measurement wheels to actuators, which excite the axle. The excitations are mostly measurement data from a driving test in which identically constructed force measuring wheels were used for recording. However, synthetic excitation signals can be used, too. As mentioned above, a combination of force or torque and displacement or angle measured values is used as target values for the load on the vehicle axle. Here, the object is to simulate these so-called target signals almost ideally over the widest possible frequency spectrum.

Experience shows that realistic target signals contain significant frequency components up to around 50 Hertz. These and comparable target signals result in very high demands on the actuators in the test rigs.

For test rigs according to the state of the art, one or more linear actuators, such as hydraulic cylinders, are usually used for each degree of freedom to be activated.

The high bandwidth and quality required for the simulation of the target signals is achieved in previously known test rigs by use of an iterative learning process. In this learning process, the control inputs of the excitation units, the so-called drive signals, are systematically changed until the target signals are simulated sufficiently well. The parameters of the control are usually not changed in this process.

This previously known method has to be used up to now in order to achieve the high bandwidths required for axle tests. For other target signals, the previously described, time-consuming learning process must be carried out again.

This, among other things, is due to the structural design and the insufficient control bandwidth of the actuators usually used. In addition, there are non-linear characteristics of the vehicle axle and mostly also of the actuators used with regard to kinematics and dynamics. As a result of the aging and wear of the vehicle axle, the iterated drive signals no longer lead to a satisfactory image quality of the target signals in the case of frequently repeated invariant test maneuvers. As a result, the control must be learned again.

Other comparable load simulators also operate according to this principle.

The disadvantages of this approach are in particular that the process is very time-consuming and cost-intensive. In addition, both the test object and the test system can be irreversibly destroyed during the learning process. In this case, the learning process must be started again with another test object.

Another problem is that the so-called hardware-in-the-loop (HiL) simulation, which is widespread in the field of control unit development, cannot be used for previously known test rigs. In an HiL process, an embedded system, for example a real mechatronic component, is connected to an HiL simulator. An HiL simulator is used to simulate the real environment of the system. HiL is therefore used to secure embedded systems, to provide support during development and for early commissioning of machines and equipment. The inapplicability of HiL simulations for previously known test systems is due to the fact that target signals that originate from an HiL simulation cannot be simulated by the test rig actuators under real-time conditions. An application of HiL simulations that has not been possible so far is, for example, the development of chassis control systems with a real constructed vehicle axle. The HiL simulation with a real constructed vehicle axle is thus a previously inapplicable method for the development of chassis control systems.

It is well known to iterate drive signals. This corresponds to an iteration of the target value precontrol. This is established because generally known actuators have too little control bandwidth to apply high-frequency signal components to the reference profiles to be applied for meaningful tests. However, this is very time-consuming and cost-intensive.

Starting from this, it is the object of the invention to provide a method for dynamic load simulation which reduces the time and cost expenditure compared to previously known methods and at the same time enables hardware-in-the-loop simulations to be applied.

This object is achieved by the subject matter of claim 1. Preferred developments can be found in the dependent claims.

The method according to the invention for dynamic load simulation thus provides that a load (target signal) is applied to a test object by a parallel kinematic excitation unit with an end effector, comprising the following operations:
measuring loads at a contact point,
comparing the measured loads with the target signals, and
determining target pressures for individual actuators of the parallel kinematic excitation unit for applying the target signals by use of a control algorithm.

By means of the aforementioned control method the iterative learning processes can be reduced, which reduces time and therefore costs. A direct adjustment of the target values for loading the test object is made possible by the actuator system which is essential to the invention, namely by a parallel kinematic excitation unit. That is preferably a hexapod. In addition to the enormous time and cost savings, the test rig design of the parallel kinematic excitation unit also enables lower energy consumption and a reduced space requirement. The operations must all take place in one time step. In particular, the operations follow in succession in the algorithm, i.e. first the measured values are detected, then the control algorithm is evaluated and finally the control signals are output to the actuators.

In particular, the target signals can be applied to the end effector by means of a control of the target pressures for the actuators determined by the control algorithm.

In general, the dynamic behavior of the end effector, in particular with a parallel kinematic excitation unit designed as a hexapod, can be described by the following equation of motion:

$$M(z) \cdot z'' + C(z,z') \cdot z' + g(z) = J^{-T}(z) \cdot F_q - \tau. \quad [I]$$

Here M (z) is a mass matrix, C (z, z')·z' is a vector of generalized centrifugal and Coriolis forces, g (z) is a vector of generalized weight forces, $J^{-T}$ (z) is a negatively transposed Jacobian matrix, z is a position vector, z', z'' its first and second time derivative. $F_q$ are the forces applied on the end effector by the cylinders of the parallel kinematic excitation unit and τ is a load vector between the end effector and the test object.

For position control, based on the equation of motion [I], at first the following approach is used to compensate for non-linearities:

$$F_{q,ref} = J^T(z) \cdot [M(z) \cdot u_{fl,P} + C(z,z') \cdot z' + g(z) + \tau] \quad [II]$$

With an ideal model and ideal measurement and observation, the overall system behaves like a double integrator in every spatial direction with respect to a new system input $u_{fl,P}$. The individual displacements and rotations are decoupled. Based on this compensation approach, the position control is achieved in particular according to the formula $$u_{fl,P} = z''_{ref} + R_D(z'_{ref} - z') + R_P(z_{ref} - z) \quad [III]$$

wherein modifications are possible. By inserting equation [II] for position control ($F_{q,ref}$) into the equation of motion [I] and $u_{fl,P}$ into the resulting equation, it follows:

$$z'' = z''_{ref} + R_D(z'_{ref} - z') + R_P(z_{ref} - z) \quad [IV]$$

and from this by rearranging the error differential equation with $\Delta z = z_{ref} - z$ $$\Delta z'' + R_D \Delta z' + R_P \Delta z = 0 \quad [V]$$

With a sufficiently precise model and a suitable choice of the controller gains $R_D$ and $R_P$, a globally asymptotically stable position control loop results.

According to a modification of the invention it is provided that the control algorithm comprises at least one variable to be iterated. By means of the iterative determination of directionally decoupled quantities instead of the iteratively determined drive signals or instead of an iterated target precontrol, the iterative determination of the control signals of the actuators of the parallel kinematic excitation unit is considerably simplified. In particular, this reduces the expenditure of time and costs.

In order to avoid complex measurement technology, it is advantageous for the implementation of this approach to implement a state observer. Such a state observer is exemplified in the scientific publication "Sliding Mode and Continuous Estimation Techniques for the Realization of Advanced Control Strategies for Parallel Kinematics" from "S. Flottmeier, S. Olma and A. Trachtler" from the Heinz Nixdorf Institute of the University of Paderborn and preferred for the present invention.

In the present case, forces and moments within the sense of the invention are regularly combined to loads in a simplified manner. In particular, it is provided in the present case that the measurement of loads is carried out by a force measuring wheel at the contact point.

Furthermore, a preferred embodiment of the invention can be improved in that the control algorithm includes a compensation for non-linearities. This allows the target pressures of the individual actuators to be determined without undesired vibrations being generated in the system. For example, the control algorithm can include a new system input to compensate for non-linearities.

A preferred approach for controlling the contact forces/moments is to use the following control algorithm:

$$F_{q,ref} = J^T(z) \cdot [M(z) \cdot z'' + C(z,z') \cdot z' + g(z) + u_{fl,F}]. \quad [VI]$$

Here, $u_{fl,F}$ is a new system input for force control. $u_{fl,F}$ can be interpreted as a force and moment vector between the end effector and the test object and the force control can be designed as follows, for example:

$$u_{fl,F} = \tau + R_F(\tau_{ref} - \tau) + R_{F,D}(\tau'_{ref} - \tau'). \quad [VII]$$

Here, τ, τ', $\tau_{ref}$ and $\tau'_{ref}$ are load vectors that act between the end effector and the test object and $R_F$ and $R_{F,D}$ are control parameters formed as matrices.

By inserting the aforementioned control algorithm $F_{q,ref}$ (equation [VI]) into the aforementioned equation of motion M (z)·z''+C (z, z')·z'+g (z)=$J^{-T}$ (z)·$F_q$−τ (equation [I]) and the exemplary force control $u_{fl,F}$ (equation [VII]) into the resulting equation, the error differential equation follows:

$$R_{F,D} \Delta \tau' + R_F \Delta \tau = 0 \quad [VIII]$$

In particular, the control parameters $R_F$ and $R_{F,D}$ are determined in such a way that a first order control error differential equation converges to zero. Instead of the control law in equation [VII] other control rules can also be selected, which may have a different control error differential equation.

As a result, the loads, i.e. the actual forces or moments, converge against the target forces or moments.

Alternatively, a force control can be achieved by use of the following equation of the control algorithm as a direct force control:

$$F_{q,ref} = F_q + J^T(z) \cdot [R_F(\tau_{ref} - \tau) + R_{F,D}(\tau'_{ref} - \tau')] \quad [IX]$$

Here, $F_q$ are the forces applied to the end effector by the cylinders of the parallel kinematic excitation unit, $J^T$ (z) is a transposed Jacobian matrix, τ, τ', $\tau_{ref}$ and $\tau'_{ref}$ are load vectors that act between the end effector and the test object, and $R_F$ and $R_{F,D}$ are control parameters designed as matrices.

The preferred, presented force control concepts advantageously stand out by the fact that, based on a compensation of all system-inherent non-linearities with the help of observed or estimated system states and their time derivatives, a simple force control design by use of the methods of linear control technology is enabled.

Approaches for position control or force control can be expanded to a hybrid force/position control by selecting the control algorithm in such a way that a force or position control can be selected for each degree of freedom, wherein the control algorithm is formed as a hybrid force/position control approach.

A preferred embodiment of the control algorithm in this regard provides for the following equation:

$$F_{q,ref} = J^T(z) \cdot [C(z,z') \cdot z' + g(z) + (1-S) \cdot (M(z) \cdot u_{fl,P} + \tau) + S \cdot (M(z) \cdot z'' + u_{fl,F})] \quad [X]$$

Here, $J^T$ (z) is a transposed Jacobian matrix, C (z, z')·z' is a vector of generalized centrifugal and Coriolis forces, z is a position vector, g (z) is a vector of generalized weight forces, S is a selection matrix, M (z) is a mass matrix, τ is a load vector between the end effector and the test object, $u_{fl,P}$ and $u_{fl,F}$ are new system inputs for position and force control. In particular, with this control algorithm, both the position and the force control bandwidth and quality are sufficiently high for an axle test.

The object of being able to choose between position and force control individually for each degree of freedom can alternatively also be achieved in the following way: For the position-controlled degrees of freedom, a position control algorithm is formulated in such a way that it sets the target values for a subordinate force control according to the former control algorithm.

In particular, to ensure the steady-state accuracy, a preferred measure of the invention provides that a compensation controller, a general transfer element, a PID controller or a PD controller with an additional sliding mode component is used for force and/or position control. In particular, these aforementioned controllers are used instead of a PD controller.

Furthermore, the method according to the invention is advantageously designed in that a means for compensating disturbance variables and/or for applying disturbance variables is used, which is designed such that a disturbance behavior in the adjustment of the target pressures is reduced, wherein disturbance variables to be compensated are measured or determined directly prior to a compensation of the disturbance variables. The determination is made in particular by observation or estimation. A sufficiently good observation of non-measurable quantities results, for example, from the scientific publication "Sliding Mode and Continuous Estimation Techniques for the Realization of Advanced Control Strategies for Parallel Kinematics" by "S. Flottmeier, S. Olma and A. Trächtler" from the Heinz Nixdorf Institute of the University of Paderborn which is included herein as a reference.

It is advantageously provided that a non-linear kinematics and/or dynamics of the test object measured when measuring loads at the contact point is determined and used as a precontrol to improve the control.

Due to the high bandwidth of the subordinate pressure or force control loop at a level of approximately 130 Hertz, the method according to the invention achieves compliance with the high requirements for axle testing under real-time conditions. In order to achieve the bandwidth of around 130 Hertz, it is referred to the scientific publication "Control of a hydraulic hexapod for a Hardware-in-the-Loop axle test rig" by "Andreas Kohlstedt, Simon Olma, Sarah Flottmeier, Phillip Traphöner, Karl-Peter Jäker, and Ansgar Trächtler" from the University of Paderborn which is included herein as a reference.

Furthermore, a preferred embodiment of the invention can be improved in that a phase and/or amplitude drop in a band-limited force control loop is compensated by a phase and amplitude correction.

The method according to the invention thus differs in the new approach to simulate loads with the aid of a force control or a hybrid position/force control. The drive signal generation takes place via a non-linear control and not as part of an iteration process. The drive signals calculated in this way lead to a sufficiently accurate simulation of the target signals in highly dynamic tests, for example in the case of operational stability analyzes of vehicle axles.

In contrast to the prior art with regard to the method for axle testing, that is, according to the previously known approach with test rig iteration, the present approach enables target signals to be applied under real-time conditions. Compared to the established approach, no learning process is required, but only a relatively short process of axis identification for parameterizing the force control parameters. The iteration of individual target signals with the disadvantages mentioned is dispensed with. The present invention is therefore associated with a clear time and cost advantage compared to the method according to the prior art.

Since the control takes place in real time, the invention also enables the use of hardware-in-the-loop techniques to develop chassis control systems with a real vehicle axle set up in the test rig.

According to a preferred embodiment of the previously known method, it is provided that the control algorithm is selected such that a model-based compensation of the non-linearities takes place according to equation [II]:

$$F_{q,ref} = J^T(z) \cdot [M(z) \cdot u_{fl,P} + C(z,z') \cdot z' + g(z) + \tau] \quad \text{[II]}$$

By using parallel kinematics and the objective model-based compensation of the non-linearities, the decoupled quantities $u_{fl,P}$ can be used directly as optimization quantities of the iteration, i.e. as drive signals. Thus, the negative effects of the non-linearities of the excitation unit and the mutual coupling of the individual actuators are greatly reduced.

As an alternative to the aforementioned exemplary method, a preferred embodiment can be that the control algorithm is selected in such a way that the target loads by the actuators are used as the variable to be iterated:

$$F_{q,ref} = J^T(z) \cdot \tau_{q,ref} \quad \text{[XI]}$$

Here $\tau_{q,ref}$ are the target loads between the end effector and the test object and $J^T(z)$ is a transposed Jacobian matrix.

In the case of the aforementioned improved iteration process, a significantly faster convergence of the iteration process, that is, the formation of the drive signals to simulate the desired target signals, and thus the entire scope of the test, can be expected. This also goes hand in hand with high savings in terms of development expenses and times.

Possible combinations of control and iteration are also conceivable. In this way, for example, the quality of the control can be improved by a subsequent iteration.

Furthermore, in order to achieve the object of the present invention the invention relates to a system for dynamic load simulation between a parallel kinematic excitation unit and a test object, comprising components according to at least one of the preceding features. The inventions presented are particularly suitable for the application example "vehicle test rig", without being limited thereto. In general, the teaching of the invention can also be transferred to other multi-axle actuator systems.

Figure 5:
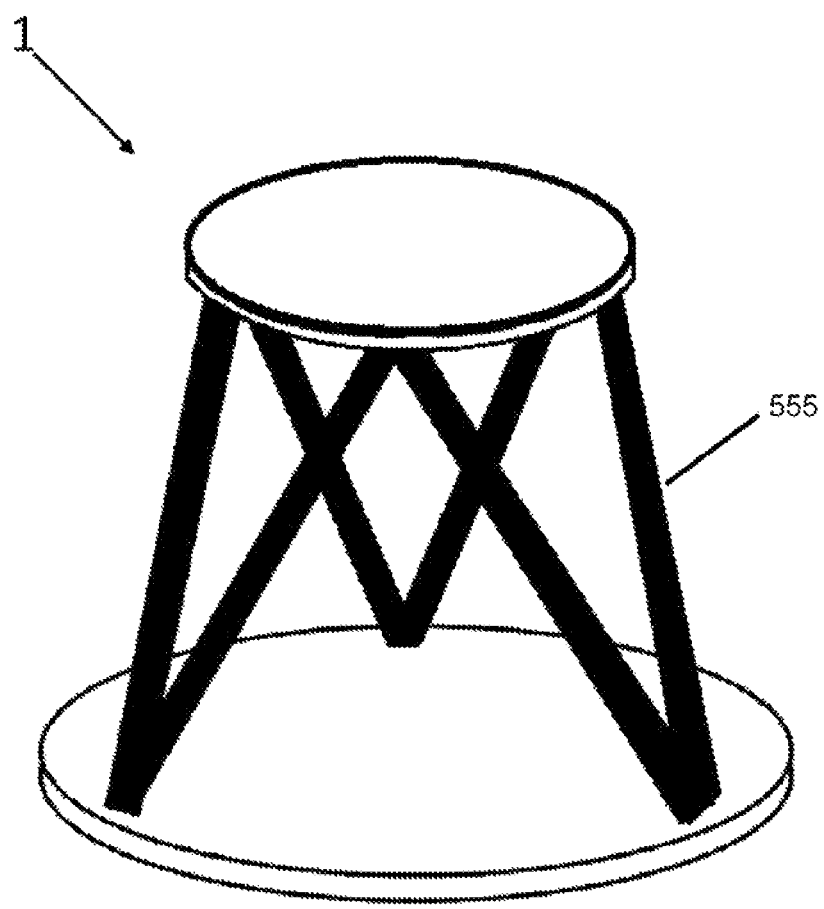

FIG. 5 schematically shows a perspective view of a parallel kinematic excitation unit designed as a hexapod.

Figure 1:
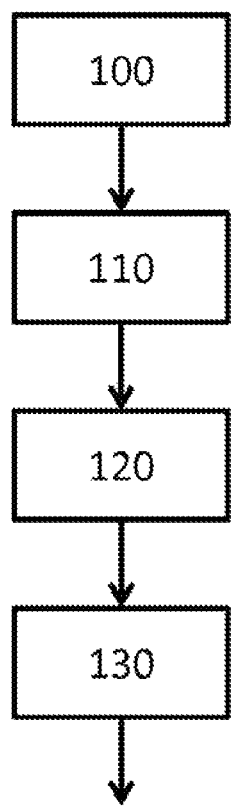
FIG. 1 shows a flow chart of a method according to the prior art.

FIG. 1 shows a flow chart according to the prior art for the simulation of target signals from previously known test rigs. As a rule, one or more linear actuators, such as hydraulic cylinders, are used for each degree of freedom to be activated. The high bandwidth and quality required for simulating the target signals is achieved in such test rigs with the help of an iterative learning process. With the help of the learning process, the control inputs of the excitation units, so-called drive signals, are systematically changed until the target signals are simulated sufficiently well. In this process, the parameters of the control are usually not changed.

Initially, according to FIG. 1, target signals (100) are set by recording load data. The next step is a system identification (110). This means that an iteration takes place until a sufficiently good, linear model is provided. This is followed by a target simulation (120). This corresponds to an iteration until the test loads achieved reflect the target signals sufficiently well. Finally, the drive signals (130) are obtained as control signals for the actuators.

So far, the high bandwidths required have only been achieved for the axle test by use of the previously known procedure. The tedious learning process must be carried out again for other target signals. The reasons for this approach are, among others, the structural design and the narrow control bandwidth of the actuators used. In addition, there are the strongly non-linear characteristics of the test object, in particular the vehicle axle, and mostly also the actuators used with regard to kinematics and dynamics. As a result of aging and wear of the vehicle axle mentioned as an example, the iterated drive signals no longer lead to a satisfactory imaging quality of the target signals in the case of frequently repeated, constant test maneuvers. As a result, the control must be learned again.

Figure 2:
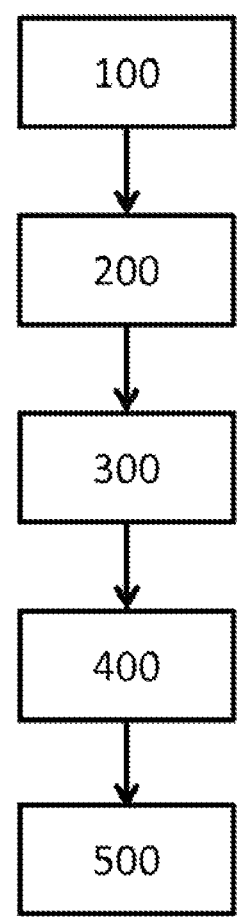
FIG. 2 shows a flow chart of a first embodiment of the invention.

In contrast, FIG. 2 shows a flow chart according to a first embodiment as a control method for dynamic load simulation. Here, a load (target signal) is applied to a test object by a parallel kinematic excitation unit (1) with an end effector, including the following operations:

Defining target signals (100) for loads to be applied to a contact point between the end effector and the test object, measuring loads at the contact point (200), comparing the measured loads with the target signals (300), determining target pressures (400) for individual actuators of the parallel kinematic excitation unit (1) for applying the target signals by use of a control algorithm ($F_{q,ref}$), and applying the target signals (500) to the end effector by means of a control of the target pressures for the actuators determined by the control algorithm ($F_{q,ref}$).

In general, the dynamic behavior of the end effector, in particular with a parallel kinematic excitation unit designed as a hexapod, can be described by the following equation of motion: $M(z) \cdot z'' + C(z, z') \cdot z' + g(z) = J^{-T}(z) \cdot F_q - \tau$ (equation [I]). Here, $M(z)$ is a mass matrix, $C(z, z') \cdot z'$ is a vector of generalized centrifugal and Coriolis forces, $g(z)$ is a vector of generalized weight forces, $J^{-T}(z)$ is a negatively transposed Jacobian matrix, $z$ is a position vector, $F_q$ are the forces applied to the end effector by the cylinders of the parallel kinematic excitation unit and ti is a load vector between the end effector and the test object.

For position control, based on the equation of motion, the following approach is initially used to compensate for non-linearities:

$F_{q,ref} = J^T(z) \cdot [M(z) \cdot u_{fl,P} + C(z, z') \cdot z' + g(z) + \tau]$ (equation [II]). With an ideal model and ideal measurement and observation, the overall system thus behaves like a double integrator in every spatial direction with regard to the new system input $u_{fl,P}$. The individual displacements and rotations are decoupled. Based on this compensation approach, the position control is achieved based on the formula $u_{fl,P} = z''_{ref} + R_D (z'_{ref} - z') + R_P (z_{ref} - z)$ (equation [III]), wherein modifications thereof are possible. By inserting the equation for position control ($F_{q,ref}$) into the equation of motion and $u_{fl,P}$ into the resulting equation:

$z'' = z''_{ref} + R_D (z'_{ref} - z') + R_P (z_{ref} - z)$ (equation [IV]) and from this the error differential equation $\Delta z'' + R_D \Delta z' + R_P \Delta z = 0$ (equation [V]) is obtained by rearranging. With a sufficiently precise model and a suitable choice of the controller gains $R_D$ and $R_P$, a globally asymptotically stable position control loop results.

Step (400) shown in FIG. 2 with respect to the use of the control algorithm ($F_{q,ref}$) comprises at least one directionally decoupled variable ($u_{fl,P}$, $u_{fl,F}$). In particular, a directionally decoupled variable is a new system input.

The new system input ($u_{fl,F}$) is preferably formed as follows:

$$u_{fl,F} = \tau + R_F (\tau_{ref} - \tau) + R_{F,D} (\tau'_{ref} - \tau') \quad \text{(equation [VII])},$$

wherein $\tau$, $\tau'$, $\tau_{ref}$ and $\tau'_{ref}$ are load vectors that act between the end effector and the test object and $R_F$ and $R_{F,D}$ are control parameters formed as matrices. Here, the control parameters $R_F$ and $R_{F,D}$ are determined in particular in such a way that they converge to zero as a first order error differential equation. This preferably means that the first order error differential equation converges to zero as follows:

$$R_{F,D} \Delta \tau' + R_F \Delta \tau = 0 \quad \text{(equation [VIII])}.$$

The following control algorithm ($F_{q,ref}$) is preferably used for step (400):

$$F_{q,ref} = J^T(z) \cdot [M(z) \cdot z'' + C(z, z') \cdot z' + g(z) + u_{fl,F}] \quad \text{(equation [VI])},$$

wherein $u_{fl,F}$ is a new system input for force control, $J^T(z)$ is a transposed Jacobian matrix, $M(z)$ is a mass matrix, $z$ is a position vector, $C(z, z') \cdot z'$ is a vector of generalized centrifugal and Coriolis forces and $g(z)$ is a vector of generalized weight forces.

This equation is chosen to control the forces and moments between the end effector and the test object, wherein, moreover, a new system input $u_{fl,F}$ is chosen. $u_{fl,F}$ can be interpreted as a force and moment vector between the end effector and the environment. Based on this, the aforementioned force control $u_{fl,F} = \tau + R_F (\tau_{ref} - \tau) + R_{F,D} (\tau'_{ref} - \tau')$ (equation [VII]) can be formulated. Modifications of this force control are possible. By inserting the control algorithm ($F_{q,ref}$) into the aforementioned equation of motion $M(z) \cdot z'' + C(z, z') \cdot z' + g(z) = J^{-T}(z) \cdot F_q - \tau$ (Equation [I]) and by inserting the force control $u_{fl,F} = \tau + R_F (\tau_{ref} - \tau) + R_{F,D} (\tau'_{ref} - \tau')$ (equation [VII]) in the equation just developed by use of the control algorithm ($F_{q,ref}$) and the equation of motion the aforementioned differential error equation $R_{F,D} \Delta \tau' + R_F \Delta \tau = 0$ (equation [VIII]) is obtained. With a suitable choice of the matrices $R_{F,D}$ and $R_F$, the first order error differential equation converges to zero. As a result, the actual forces or moments converge against the target forces or moments.

Figure 3:
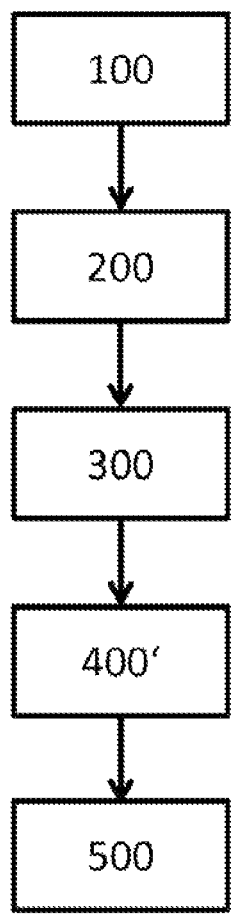
FIG. 3 shows a flow chart of a second embodiment of the invention.

Alternatively, a force control in step (400') according to FIG. 3 can also be realized by the following control rule: $F_{q,ref} = F_q + J^T(z) \cdot [R_F (\tau_{ref} - \tau) + R_{F,D} (\tau'_{ref} - \tau')]$ (equation [IX]). Here, $F_q$ are the forces applied to the end effector by the cylinders of the parallel kinematic excitation unit, $J^T(z)$ is a transposed Jacobian matrix, $\tau$, $\tau'$, $\tau_{ref}$ and $\tau'_{ref}$ are load vectors that act between the end effector and the test object, and $R_F$ and $R_{F,D}$ are control parameters designed as matrices. In this way, a direct force control is achieved.

Figure 4:
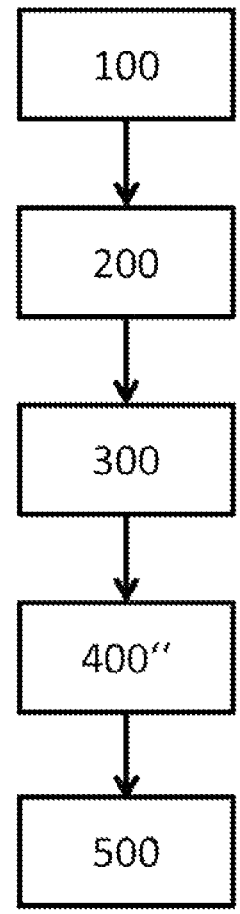
FIG. 4 shows a flow chart of a third embodiment of the invention.

Another alternative of steps (400) and (400') to step (400'') is appreciated in FIG. 4, wherein a choice has to be made between force and position control for each degree of freedom. This is achieved by appropriately adding a selection matrix $S = \text{diag}(s_i)$. With $s_i = 1$ for force-controlled degrees of freedom and $s_i = 0$ for position-controlled degrees of freedom, the hybrid force/position control approach results, for example, from equations [II], [III], [VI] and [VIII]:

$F_{q,ref} = J^T(z) \cdot [C(z,z') \cdot z' + g(z) + (1-S) \cdot (M(z) \cdot u_{fl,P} + \tau) + S \cdot (M(z) \cdot z'' + u_{fl,F})]$ (equation [X]), wherein $J^T(z)$ is a transposed Jacobian matrix, $C(z, z') \cdot z'$ is a vector of generalized centrifugal and Coriolis forces, z is a position vector, g (z) is a vector of generalized weight forces, S is a selection matrix, M (z) is a mass matrix, τ is a load vector between the end effector and the test object and $u_{fl,P}$ and $u_{fl,F}$ are new system inputs for the position and force control.

By using parallel kinematics and the possible model-based compensation of the non-linearities according to equation [III], the decoupled variables can be used directly as optimization variables for the iteration, that is, as drive signals. The negative effects of the non-linearities of the excitation unit (1) and the mutual coupling of the individual actuators are thereby greatly reduced.

Alternatively, it can be provided that the control algorithm ($F_{q,ref}$) is selected in such a way that the target loads by the actuators are used as the variable ($\tau_{q,ref}$) to be iterated: $F_{q,ref} = J^T(z) \cdot \tau_{q,ref}$ (equation [XI]), wherein $J^T(z)$ is a transposed Jacobian matrix. Here, $\tau_{q,ref}$ are the target loads between the end effector and the test object and $J^T(z)$ is the transposed Jacobian matrix.

As shown by way of example in FIG. 5, the parallel kinematic excitation unit (1) is a hexapod. It is preferred, but not recognizable in FIG. 5, that the measurement of loads at the contact point is carried out by a force measuring wheel. It is also preferred that the test object is a vehicle axle. Thus, FIG. 5 discloses at least partially a system for dynamic load simulation between a parallel kinematic excitation unit and a test object, at least comprising components according to the preceding description.

LIST OF REFERENCE SYMBOLS 1 parallel kinematic excitation unit
100 setting target signals
110 system identification according to the state of the art
120 target simulation according to the state of the art
130 drive signals according to the state of the art
200 measuring loads at the contact point
300 comparing the measured loads with the target signals
400 determining target pressures by use of a first control algorithm
400' determining target pressures by use of an alternative control algorithm
400" determining target pressures by use of a further alternative control algorithm
500 applying target signals
555 individual actuators

The invention claimed is:

1. A method for dynamic load simulation comprising the steps of:
applying a target signal (300) to a test object using a parallel kinematic excitation unit with an end effector wherein the parallel kinematic excitation unit comprises individual actuators;
specifying a load by use of the target signal;
measuring the load at a contact point (200) with a force measuring wheel;
comparing the measured load to the applied target signal (300) with a control unit;
determining target pressures (400) for the individual actuators of the parallel kinematic excitation unit by use of a control algorithm ($F_{q,ref}$);
applying the target signals (300) to the end effector by means of a control of the target pressures (400) for the actuators determined by the control algorithm $F_{q,ref} = J^T(z) \cdot [M(z) \cdot z'' + C(z,z') \cdot z' + g(z) + u_{fl,F}]$, wherein $u_{fl,F}$ is a new system input for force control, $J^T(z)$ is a transposed Jacobian matrix, M (z) is a mass matrix, z is a position vector, $C(z, z') \cdot z'$ is a vector of generalized centrifugal and Coriolis forces and g (z) is a vector of generalized weight forces; and
applying the determined target pressures (400) to the target signal (300).

2. The method according to claim 1, wherein a new system input ($u_{fl,F}$) for force control is formed as follows:

$u_{fl,F} = \tau + R_F(\tau_{ref} - \tau) + R_{F,D}(\tau'_{ref} - \tau')$, wherein τ, τ', $\tau_{ref}$ and $\tau'_{ref}$ are load vectors that act between the end effector and the test object and $R_F$ and $R_{F,D}$ are control parameters formed as matrices.

3. The method according to claim 2, wherein the control parameters $R_F$ and $R_{F,D}$ are determined such that a control error differential equation converges to zero.

4. A method for dynamic load simulation, comprising the steps of:
applying a target signal (300) to a test object using a parallel kinematic excitation unit with an end effector wherein the parallel kinematic excitation unit comprises individual actuators;
specifying a load by use of the target signal;
measuring the load at a contact point (200) with a force measuring wheel;
comparing the measured load to the applied target signal (300) with a control unit;
determining target pressures (400) for the individual actuators of the parallel kinematic excitation unit by use of a control algorithm ($F_{q,ref}$);
applying the target signals (300) to the end effector by means of a control of the target pressures (400) for the actuators determined by the control algorithm ($F_{q,ref}$);
wherein a direct force control is achieved by the following control algorithm ($F_{q,ref}$):

$F_{q,ref} = F_q + J^T(z) \cdot [R_F(\tau_{ref} - \tau) + R_{F,D}(\tau'_{ref} - \tau')]$, wherein $F_q$ are the forces applied to the end effector by the cylinders of the parallel kinematic excitation unit, $J^T(z)$ is a transposed Jacobian matrix, τ, τ', $\tau_{ref}$ and $\tau'_{ref}$ are the load vectors that act between the end effector and the test object, and $R_F$ and $R_{F,D}$ are control parameters designed as matrices.

5. A method for dynamic load simulation comprising the steps of:
applying a target signal (300) to a test object using a parallel kinematic excitation unit with an end effector wherein the parallel kinematic excitation unit comprises individual actuators;
specifying a load by use of the target signal;
measuring the load at a contact point (200) with a force measuring wheel;
comparing the measured load to the applied target signal (300) with a control unit;
determining target pressures (400) for the individual actuators of the parallel kinematic excitation unit by use of a control algorithm ($F_{q,ref}$);
applying the target signals (300) to the end effector by means of a control of the target pressures (400) for the actuators determined by the control algorithm ($F_{q,ref}$);
wherein the control algorithm ($F_{q,ref}$) is carried out according to the following equation:

$F_{q,ref} = J^T(z) \cdot [C(z,z') \cdot z' + g(z) + (1-S) \cdot (M(z) \cdot u_{fl,P} + \tau) + S \cdot (M(z) \cdot z'' + u_{fl,F})]$, wherein $J^T(z)$ is a transposed Jacobian matrix, $C(z, z') \cdot z'$ is a vector of generalized centrifugal and Coriolis forces, z is a position vector, $g(z)$ is a vector of generalized weight forces, S is a selection matrix, $M(z)$ is a mass matrix, $\tau$ is a load vector between the end effector and the test object, and $u_{fl,P}$ and $u_{fl,F}$ are the new system inputs for position and force control.

6. The method according to any one of the preceding claims, wherein a compensation controller, a general transmission element, a PID controller, or a PD controller with an additional sliding mode component is used for force and/or position control.

7. The method according to any one of claims 5 to 6, wherein a means for compensating disturbance variables and/or for adding disturbance variables is used, which is designed such that a disturbance behavior of the control of the target pressures is reduced, wherein disturbance variables to be compensated can be measured or determined directly before the disturbance variables are compensated.

8. The method according to any one of claims 5 to 7, wherein a measured non-linear kinematics and/or dynamics of the test object is determined and used as a precontrol.

9. The method according to any one of the preceding claims, wherein a phase and/or amplitude drop in a band-limited force control loop is compensated by a phase and amplitude correction.

10. The method according to any one of the preceding claims, wherein the control algorithm ($F_{q,ref}$) is selected such that a model-based compensation of the non-linearities takes place according to the following equation:

$$F_{q,ref} = J^T(z) \cdot [M(z) \cdot u_{fl,P} + C(z,z') \cdot z' + g(z) + \tau],$$

wherein $J^T(z)$ is a transposed Jacobian matrix, $M(z)$ is a mass matrix, $u_{fl,P}$ is a new system input for force control, z is a position vector, $C(z, z') \cdot z'$ is a vector of generalized centrifugal and Coriolis forces, $g(z)$ is a vector of generalized weight forces and $\tau$ is a load vector between the end effector and the test object.

11. The method according to any one of the preceding claims, wherein the control algorithm ($F_{q,ref}$) is selected such that the target loads by the actuators are used as the variable ($\tau_{q,ref}$) to be iterated:

$$F_{q,ref} = J^T(z) \cdot \tau_{q,ref},$$

wherein $\tau_{q,ref}$ are the target loads between the end effector and the test object and $J^T(z)$ is a transposed Jacobian matrix.

12. The method according to any one of the preceding claims, wherein the parallel kinematic excitation unit is a hexapod.

13. The method according to any one of the preceding claims, wherein the measuring of loads at the contact point is carried out by a force measuring wheel.

14. The method according to any one of the preceding claims, wherein the test object is a vehicle axle.

15. The method according to any one of the preceding claims, characterized by defining target signals (100) for loads to be applied to the contact point between the end effector and the test object, wherein this is implemented prior to the step of measuring loads at the contact point (200).

16. The method according to any one of the preceding claims, characterized by applying the target signals (500) to the end effector by means of a control of the target pressures for the actuators determined by the control algorithm ($F_{q,ref}$), wherein this is implemented subsequently to the step of determining the target pressures (400) for individual actuators of the parallel kinematic excitation unit.

17. System for dynamic load simulation between a parallel kinematic excitation unit and a test object, comprising components suitable for carrying out method steps according to at least one of the preceding claims.

* * * * *